(12) United States Patent
Neven et al.

(10) Patent No.: US 7,751,805 B2
(45) Date of Patent: Jul. 6, 2010

(54) MOBILE IMAGE-BASED INFORMATION RETRIEVAL SYSTEM

(75) Inventors: Hartmut Neven, Malibu, CA (US); Hartmut Neven, Sr., Aachen (DE)

(73) Assignee: Google Inc., Mountain View, CA (US)

(*) Notice: Subject to any disclaimer, the term of this patent is extended or adjusted under 35 U.S.C. 154(b) by 346 days.

(21) Appl. No.: 11/433,052

(22) Filed: May 12, 2006

(65) Prior Publication Data

US 2006/0240862 A1  Oct. 26, 2006

Related U.S. Application Data

(63) Continuation-in-part of application No. 11/129,034, filed on May 13, 2005, which is a continuation-in-part of application No. 10/783,378, filed on Feb. 20, 2004.

(60) Provisional application No. 60/570,924, filed on May 13, 2004, provisional application No. 60/680,908, filed on May 13, 2005, provisional application No. 60/727,313, filed on Oct. 17, 2005.

(51) Int. Cl.
*H04L 29/06* (2006.01)

(52) U.S. Cl. ............... 455/414.3; 455/414.1; 455/414.2; 455/414.4; 455/3.01; 455/3.05; 455/3.06; 455/556.1; 455/556.2; 707/3; 707/4; 707/5; 707/7; 707/10; 707/104.1; 707/204

(58) Field of Classification Search ... 455/414.1–414.4, 455/418–420, 458, 550.1, 556.1–556.2, 3.01–3.06; 382/182, 229, 181, 118; 707/104.1, 3–10, 707/200–204; 348/14.01–14.02; 345/418–419
See application file for complete search history.

(56) References Cited

U.S. PATENT DOCUMENTS

| 5,579,471 A | 11/1996 | Barber et al. |
| 5,615,324 A | 3/1997 | Kuboyama |
| 5,724,579 A | 3/1998 | Suzuki |
| 5,768,633 A | 6/1998 | Allen et al. |

(Continued)

FOREIGN PATENT DOCUMENTS

DE 10103922 A1 8/2002

(Continued)

OTHER PUBLICATIONS

Beis, J. S., et al., "Shape Indexing Using Approximate Nearest-Neighbour Search in High-Dimensional Spaces," CVPR '97, 1997, 7 pages.

(Continued)

*Primary Examiner*—Tuan A Tran
(74) *Attorney, Agent, or Firm*—Fenwick & West LLP

(57) ABSTRACT

An image-based information retrieval system, including a mobile telephone, a remote recognition server, and a remote media server, the mobile telephone having a built-in camera and a communication link for transmitting an image from the built-in camera to the remote recognition server and for receiving mobile media content from the remote media server, the remote recognition server for matching an image from the mobile telephone with an object representation in a database and forwarding an associated text identifier to the remote server, and the remote media server for forwarding mobile media content to the mobile telephone based on the associated text identifier.

38 Claims, 11 Drawing Sheets

U.S. PATENT DOCUMENTS

| | | | |
|---|---|---|---|
| 5,884,247 | A | 3/1999 | Christy |
| 5,926,116 | A | 7/1999 | Kitano et al. |
| 6,023,241 | A | 2/2000 | Clapper |
| 6,055,536 | A | 4/2000 | Shimakawa et al. |
| 6,148,105 | A | 11/2000 | Wakisaka et al. |
| 6,181,817 | B1 | 1/2001 | Zabih et al. |
| 6,208,626 | B1 | 3/2001 | Brewer |
| 6,272,231 | B1 | 8/2001 | Maurer et al. |
| 6,301,370 | B1 | 10/2001 | Steffens et al. |
| 6,393,147 | B2 | 5/2002 | Danneels et al. |
| 6,470,264 | B2 | 10/2002 | Bide |
| 6,504,571 | B1 | 1/2003 | Narayanaswami et al. |
| 7,016,532 | B2 * | 3/2006 | Boncyk et al. ............ 382/165 |
| 7,403,652 | B2 * | 7/2008 | Boncyk et al. ............ 382/165 |
| 7,477,780 | B2 * | 1/2009 | Boncyk et al. ............ 382/165 |
| 7,565,008 | B2 * | 7/2009 | Boncyk et al. ............ 382/165 |
| 2001/0032070 | A1 | 10/2001 | Teicher |
| 2002/0049728 | A1 | 4/2002 | Kaku |
| 2002/0055957 | A1 | 5/2002 | Ohsawa |
| 2002/0089524 | A1 | 7/2002 | Ikeda |
| 2002/0101568 | A1 | 8/2002 | Eberl et al. |
| 2002/0102966 | A1 | 8/2002 | Lev et al. |
| 2002/0103813 | A1 | 8/2002 | Frigon |
| 2002/0140988 | A1 | 10/2002 | Cheatle et al. |
| 2002/0156866 | A1 | 10/2002 | Schneider |
| 2002/0184203 | A1 | 12/2002 | Naster et al. |
| 2002/0187774 | A1 | 12/2002 | Ritter et al. |
| 2003/0044068 | A1 * | 3/2003 | Kagehiro et al. ............ 382/182 |
| 2003/0044608 | A1 | 3/2003 | Yoshizawa et al. |
| 2003/0164819 | A1 | 9/2003 | Waibel |
| 2003/0198368 | A1 | 10/2003 | Kee |
| 2004/0004616 | A1 * | 1/2004 | Konya et al. ............ 345/419 |
| 2004/0208372 | A1 | 10/2004 | Boncyk et al. |
| 2005/0041862 | A1 * | 2/2005 | Lo ............................ 382/181 |
| 2006/0012677 | A1 | 1/2006 | Neven et al. |
| 2006/0026202 | A1 * | 2/2006 | Isberg et al. ............ 707/104.1 |

FOREIGN PATENT DOCUMENTS

| | | |
|---|---|---|
| DE | 101 10 979 A1 | 9/2002 |
| DE | 10245900 A1 | 4/2004 |
| EP | 0 944 019 A2 | 9/1999 |
| JP | 2002-278670 A | 9/2002 |
| WO | WO 01/04790 A1 | 1/2001 |
| WO | WO 01/86613 A2 | 11/2001 |
| WO | WO 02/082799 | 10/2002 |
| WO | WO 03/001435 A1 | 1/2003 |
| WO | WO 03 041000 A1 | 5/2003 |
| WO | WO 2004/038613 A1 | 5/2004 |
| WO | WO 2005/114476 A1 | 12/2005 |

OTHER PUBLICATIONS

FEI-FEI, L., et al., "Learning Generative Visual Models from Few Training Examples: An Incremental Bayesian Approach Tested on 101 Object Categories," GMBV04, 2004, pp. 1-9.

Kovesi, P., "Image Features from Phase Congruency," Videre: Journal of Computer Vision Research, 1999, pp. 1-27, vol. 1, No. 3, The MIT Press.

Lakshmi, S., "Cell Phones, Billboards Play Tag," Jul. 10, 2003, 3 pages, [online] [retrieved on May 12, 2005] Retrieved from the Internet: <URL: http://www.wired.com/news/print/0,1294,59548,00.html>.

Lowe, D. G., "Object Recognition from Local Scale-Invariant Features," Proceedings of the International Conference on Computer Vision, Sep. 1999, pp. 1150-1157.

Takeuchi, Y., et al., "Evaluation of Image-Based Landmark Recognition Techniques," The Robotics Institute, Carnegie Mellon University, CMU-RI-TR-98-20, Jul. 1998, pp. 1-16.

Viola, P., et al., "Rapid Object Detection Using a Boosted Cascade of Simple Features," Proceedings of the IEEE Conference on Computer Vision and Pattern Recognition, Dec. 2001, pp. 1-9.

Wiskott, L., et al., "Face Recognition by Elastic Bunch Graph Matching," IEEE Transactions on Pattern Analysis and Machine Intelligence, Jul. 1997, pp. 775-779, vol. 19, No. 7.

Yang, J., et al., "An Automatic Sign Recognition and Translation System," Workshop on Perceptive User Interfaces (PUI'01), Nov. 2001, 8 pages.

Zhang, J., et al., "A PDA-Based Sign Translator," Proceedings of the Fourth IEEE International Conference on Multimodal Interfaces (ICMI'02), Oct. 14-16, 2002, pp. 217-222.

PCT International Search Report and Written Opinion, PCT/US2005/016776, Aug. 23, 2005, 11 pages.

Haynes Repair Manuals [online] [Archived on www.web.archive.org on Mar. 25, 2002; Retrieved on Dec. 4, 2008] Retrieved from the internet <URL:http://web.archive.org/web/20020325061432/http://haynes.com/>.

Yang et al., Smart Sight: A Tourist Assistant System, 3$^{rd}$ International Symposium on Wearable Computers, Oct. 1999, pp. 73-78.

Yang et al., Towards Automatic Sign Translation, Proc. Of the Human Language Technology Meeting (HLT-2001), Mar. 2001, 6 Pages.

* cited by examiner

MOBILE IMAGE-BASED INFORMATION RETRIEVAL SYSTEM

CLAIM OF PRIORITY

This application is a continuation-in-part of U.S. application No. 11/129,034, filed May 13, 2005, entitled "IMPROVED IMAGE-BASED SEARCH ENGINE FOR MOBILE PHONES WITH CAMERA", which is a continuation-in-part of U.S. application No. 10/783,378, filed Feb. 20, 2004, entitled "IMAGE-BASED SEARCH ENGINE FOR MOBILE PHONES WITH CAMERA", and which claims the benefit of U.S. Provisional Application No. 60/570,924 filed May 13, 2004, which applications are incorporated herein by reference. This application also claims the benefit of U.S. Provisional Application No. 60/680,908 filed May 13, 2005, and of U.S. Provisional Application No. 60/727,313 filed Oct. 17, 2005, which applications are incorporated herein by reference.

BACKGROUND

1. Field

Embodiments of the invention relate generally to information retrieval systems, and more particularly, to a mobile image-based information retrieval system.

2. Background

Almost all mobile phones come with an integrated camera or image capture device. The camera is typically used for taking pictures for posterity purposes, however, there are many other applications for which the images may be applied.

SUMMARY

The present invention may be embodied in an image-based information retrieval system including a mobile telephone, a remote recognition server, and a remote media server. The mobile telephone has a built-in camera and a communication link for transmitting an image from the built-in camera to the remote recognition server and for receiving mobile media content from the remote media server. The remote recognition server matches an image from the mobile telephone with an object representation in a database and forwards an associated text identifier to the remote media server. The remote media server forwards mobile media content to the mobile telephone based on the associated text identifier.

In a more detailed feature of the invention, the remote recognition server may include means for adding an object representation to the database using the mobile telephone.

Alternatively, the present invention may be embodied an image-based information retrieval system that includes a mobile telephone and a remote server. The mobile telephone has a built-in camera and a communication link for transmitting an image from the built-in camera to the remote server. The remote server has an optical character recognition engine for generating a first confidence value based on an image from the mobile telephone, an object recognition engine for generating a second confidence value based on an image from the mobile telephone, a face recognition engine for generating a third confidence value based on an image from the mobile telephone, and an integrator module for receiving the first, second, and third confidence values and generating a recognition output.

In more detailed features of the invention, the object recognition engine may comprise a textured object recognition engine, a rigid texture object recognition engine, and/or an articulate object recognition engine.

Additionally, the present invention may be embodied in an image-based information retrieval system that includes a mobile telephone and a remote server. The mobile telephone has a built-in camera, a recognition engine for recognizing an object or feature in an image from the built-in camera, and a communication link for requesting information from the remote server related to a recognized object or feature.

In more detailed features of the invention, the object may be an advertising billboard and the related information may be a web page address. Alternatively, the object may be a car and the related information may be a car manual. Also, the object may be a product and the related information may be a payment confirmation. The object may be a bus stop sign and the related information may be real-time information on the arrival of the next bus. Further, the object may be a book and the related information may be an audio stream.

In other more detailed features of the invention, the object feature may text and the related information may be a translation of the text or a web page address, provided in real-time. Similarly, the object feature may be an advertisement and the related information may be a web page address. Also, the object feature may be a picture and the related information may be an audio stream. Further, the object feature may be an equipment part and the related information may be an operation and maintenance manual for the equipment.

Other objects, features and advantages will become apparent to those skilled in the art from the following detailed description. It is to be understood, however, that the detailed description and specific examples, while indicating exemplary embodiments, are given by way of illustration and not limitation. Many changes and modifications within the scope of the following description may be made without departing from the spirit thereof, and the description should be understood to include all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION

Figure 1:
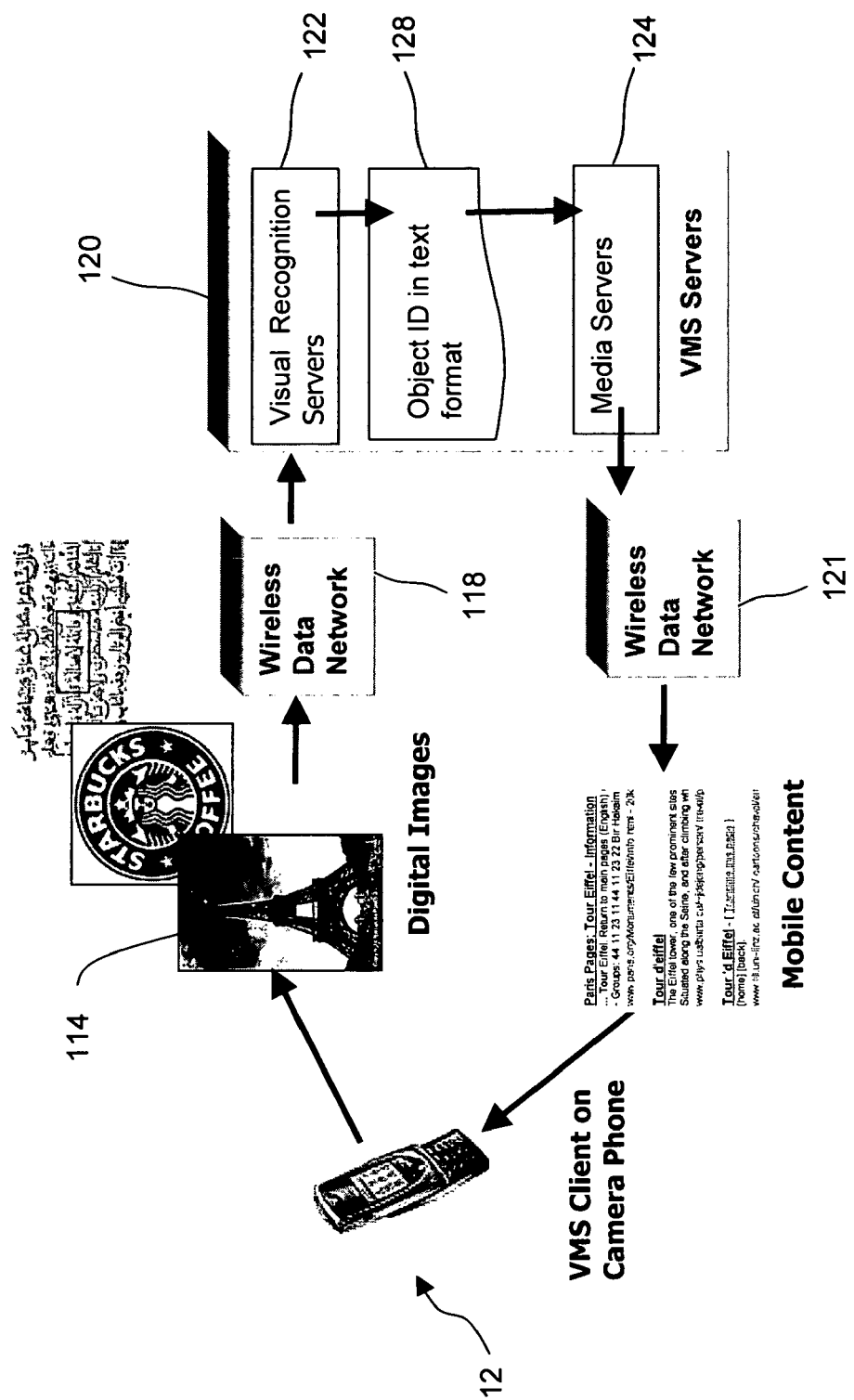
FIG. 1 is a figure illustrating the main components of the Visual Mobile Search (VMS) Service.

This invention disclosed exploits the eminent opportunity that mobile phones with inbuilt camera are proliferating at a rapid pace. Driven through the low cost of cameras the percentage of camera phones of all mobile phones is rapidly increasing as well. The expectation is that in a few years in the order of one billion mobile handsets with cameras will be in use worldwide.

This formidable infrastructure may be used to establish a powerful image-based search service, which functions by sending an image acquired by a camera phone to a server. The server hosts visual recognition engines that recognize the objects shown in the image and that returns search results in appropriate format back the user.

The disclosure at hand also describes in detail the realization of the overall system architecture as well the heart of the image-based search service, the visual recognition engines. The disclosure lists multiple inventions on different levels of the mobile search system that make it more conducive to successful commercial deployments.

1.0 System Architecture
1.1 Overview

The visual mobile search (VMS) service is designed to offer a powerful new functionality to mobile application developers and to the users of mobile phones. Mobile phone users can use the inbuilt camera 16 of a mobile phone 12 to take a picture 114 of an object of interest and send it via a wireless data network 118 such as, for example, the GPRS network to the VMS server 120. The object gets recognized and upon recognition the servers will take the action the application developer requested. Typically this entails referring the sender to a URL with mobile content 121 designed by the application developer but can entail more complex transactions as well.

VMS Servers—Typically we organize the VMS servers into two main parts:

Visual Recognition Server 122 also sometimes referred to as the object recognition (oR) server—Recognizes an object within an image, interacts with the Media Server to provide content to the client, and stores new objects in a database.

Media Server 124—Responsible for maintaining content associated with a given ID and delivering the content to a client. It also provides a web interface for changing content for a given object.

VMS Client—Mobile phones are responsible for running the VMS client to send images and receive data from the server. The VMS client is either pre-installed on the phone or comes as an over-the-air update in a Java or BREW implementation. Alternatively the communication between the phone and the recognition servers is handled via multimedia messaging (MMS). FIG. 1 illustrates the main components of the Visual Mobile Search Service.

Figure 2:
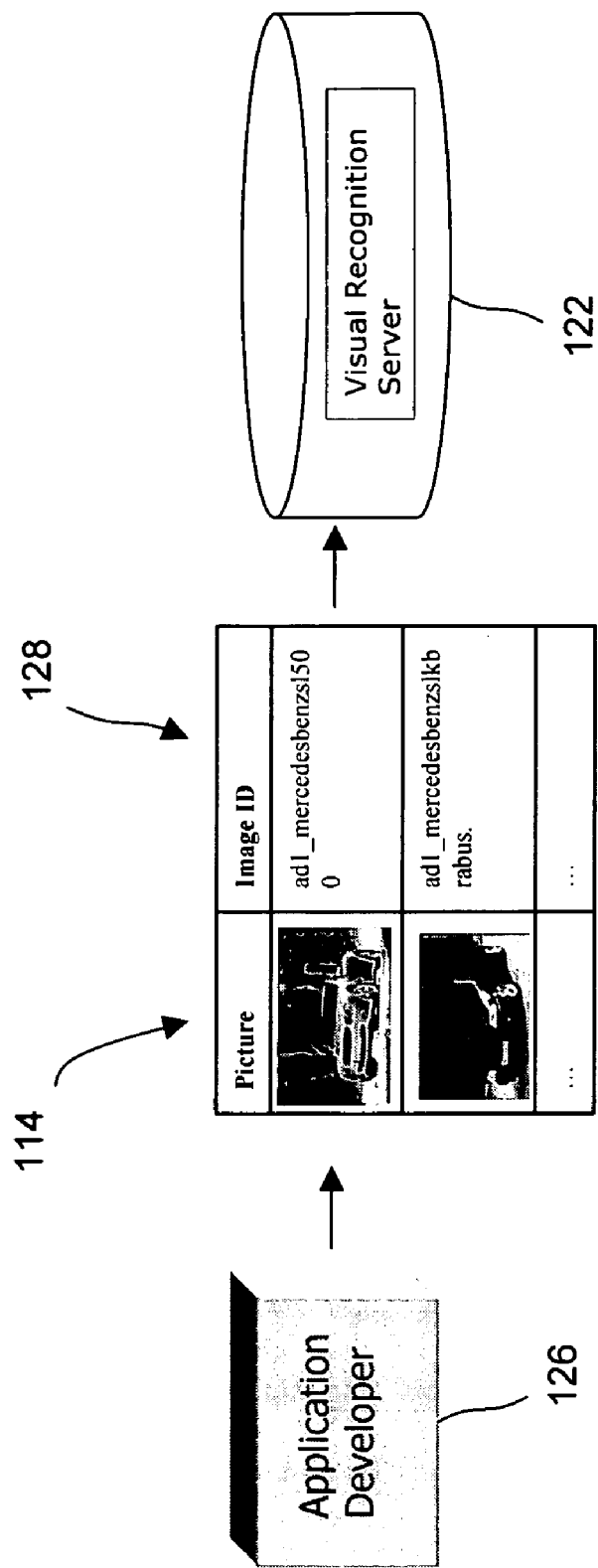
FIG. 2 is a figure illustrating the population of a database of a VMS server with image content pairs.

To make use of VMS service the application developer submits a list of pictures and associated image IDs in textual format to the visual recognition server. An application developer 126, which can occasionally be an end user himself, submits images 114 annotated with textual IDs 128 to the recognition servers. FIG. 2 illustrates the population of the database with image content pairs.

Figure 3:
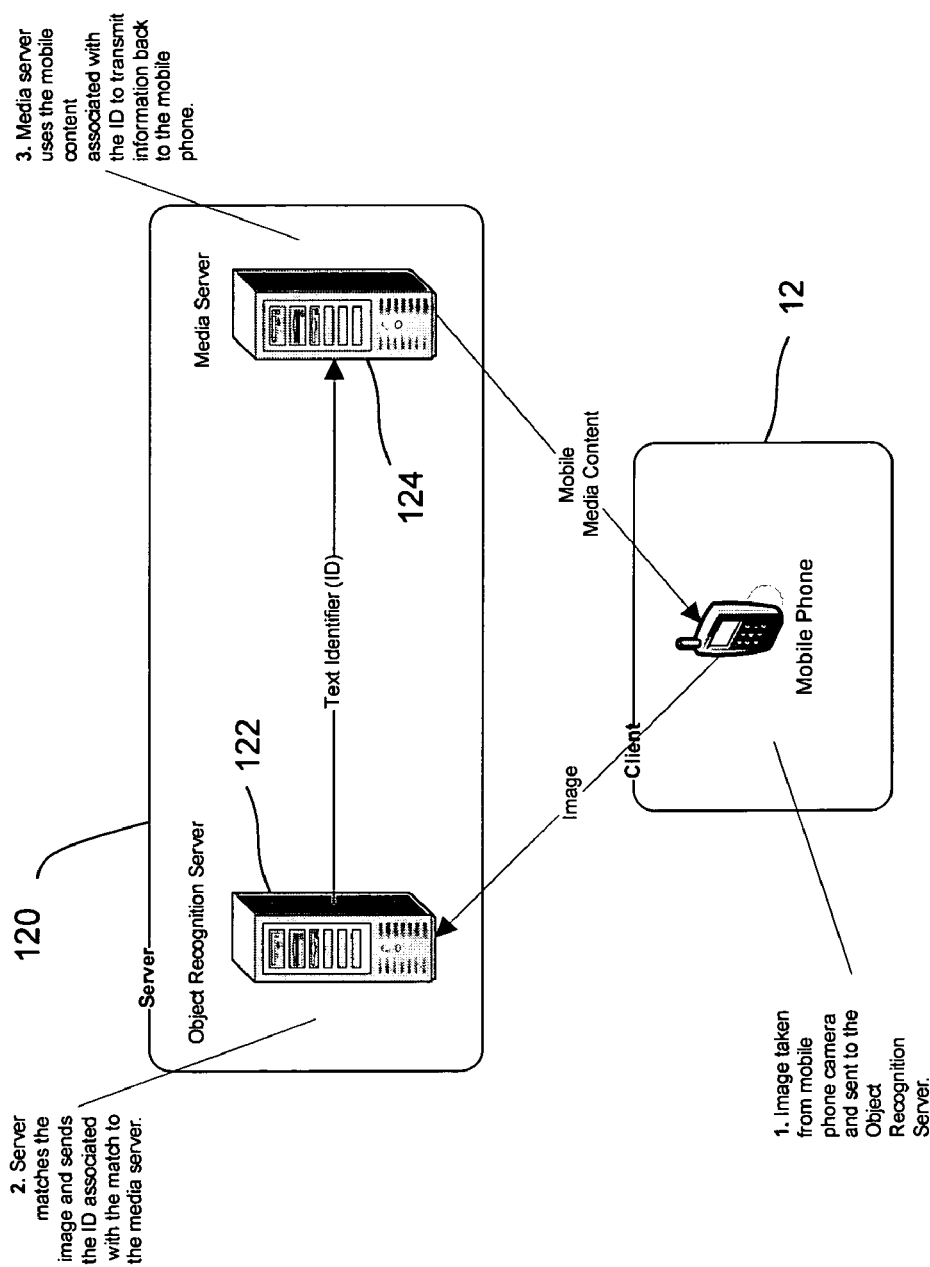
FIG. 3 is a figure illustrating the process of retrieving mobile content from the media server through visual mobile search.

FIG. 3 shows in more detail the steps involved in retrieving mobile content and how the system refers an end user to the mobile content. (1) The user takes an image with his camera phone 12 and sends it to the recognition server 122. This can either be accomplished by using a wireless data network such as GPRS or it could be send via multi media messaging MMS as this is supported by most wireless carriers. (2) The recognition server uses its multiple recognition engines to match the incoming picture against object representation stored in its database. We recommend using multiple recognition experts that specialize in recognizing certain classes of patterns. Currently we use a face recognition engine, an engine that is good for recognizing textured objects. Optical character recognizers and bar code readers try to identify text strings or bar codes. For a more detailed description of the recognition engines please refer to section 3.0. (3) Successful recognition leads to a single or several textual identifiers denoting object, faces or strings that are passed on to the so called media server 130. Upon receipt of the text strings the media server sends associated mobile multimedia content back to the VMS client on the phone. This content could consist of a mix of data types such as text, images, music or audio clips. In a current implementation the media server often just sends back a URL that can be viewed on the phone using the inbuilt web browser.

Please note that the content could simply consist of a URL which is routed to the browser on the phone who will then open the referenced mobile webpage through standard mobile web technology.

2.0 Useful Server Side Features
2.1 Multiple Engines on the Server

Years of experience in machine vision have shown that it is very difficult to design a recognition engine that is equally well suited for diverse recognition tasks. For instance, engines exist that are well suited to recognize well textured rigid objects. Other engines are useful to recognize deformable objects such as faces or articulate objects such as persons. Yet other engines are well suited for optical character recognition. To implement an effective vision-based search engine it will be important to combine multiple algorithms in one recognition engine or alternatively install multiple specialized recognition engines that analyze the query images with respect to different objects.

Figure 4:
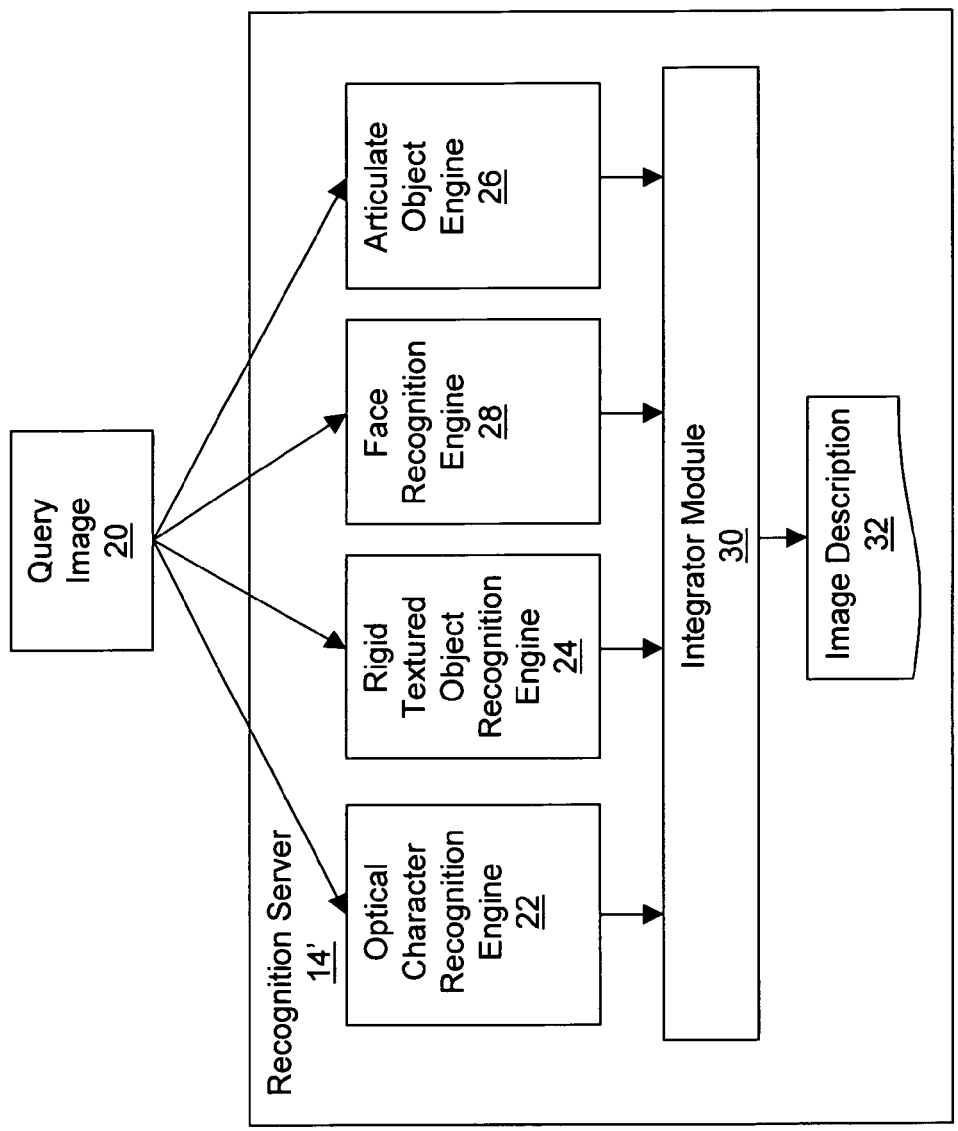
FIG. 4 is a figure illustrating an effective recognition server.

We suggest an architecture in which multiple recognition engines are applied to an incoming image. Each engine returns the recognition results with confidence values and an integrating module that outputs a final list of objects recognized. The simplest fusion rule is an and rule that simply sends all the relevant textual ID's to the media server. Another useful rule if one wants to reduce the feedback to a single result is to introduce a hierarchy among the recognition disciplines The channel which is highest in the hierarchy and which returns a result is selected to forward the text ID to the media server. FIG. 4 shows an effective recognition server 14' that is comprised of multiple specialized recognition engines that focus on recognizing certain object classes.

2.2 Maintaining the Image Database

Objects change. Therefore it is important to regularly update the object representations. This can be achieved in two ways. One way is that the service providers regularly add current image material to refresh the object representations. The other way is to keep the images that users submit for query and upon recognition feed them into the engine that updates the object representations. The later method requires a confidence measure that estimates how reliable a recognition result is. This is necessary in order not to pollute the database. There are different ways to generate such a confidence measure. One is to use match scores, topological and other consistency checks that are intrinsic to the object recognition methods described below. Another way is to rely on extrinsic quality measures such as to determine whether a search result was accepted by a user. This can with some reliability be inferred from whether the user continued browsing the page to which the search result led and/or whether he did not do a similar query shortly after.

2.3 Databases that Sort the Available Images by Location, Time and Context

To facilitate the recognition it is important to cut down the number of object representations against which the incoming image has to be compared. Often one has access to other information in relation to the image itself. Such information can include time, location of the handset, user profile or recent phone transactions. Another source of external image information is additional inputs provided by the user.

It will be very beneficial to make use of this information to narrow down the search. For instance if one attempts to get information about a hotel by taking a picture of its facade and knows it is 10 pm in the evening than it will increase the likelihood of correct recognition if one selects from the available images those that have been taken close to 10 pm. The main reason is that the illumination conditions are likely to more similar.

Location information can also be used in obvious ways. Staying with the hotel example one would arrange the search process such that only object representations of hotels are activated in the query of hotels that are close to the current location of the user.

Overall it will be helpful to organize the image search such that objects are looked up in a sequence in which object representations close in time and space will be searched before object representations that are older, were taken at a different time of day or carry a location label further away are considered.

3. Client Side

3.1 Feature Extraction on the Client Side

The simplest implementation of a search engine is one in which the recognition engine resides entirely on the server. However for a couple of reasons it might be more desirable to run part of the recognition on the phone. One reason is that this way the server has less computational load and the service can be run more economically. The second reason is that the feature vectors contain less data then the original image thus the data that needs to be send to the server can be reduced.

3.2 Caching of Frequent Searches

Another way to keep the processing more local on the handset is to store the object representations of the most frequently requested objects locally on the handset. Information on frequently requested searches can be obtained on an overall, group or individual user level.

3.3 Image Region Delivery on Demand

To recognize an object in a reliable manner sufficient image detail needs to be provided. In order to strike a good balance between the desire for a low bandwidth and a sufficiently high image resolution one can use a method in which a lower resolution representation of the image is send first. If necessary and if the object recognition engines discover a relevant area that matches well one of the existing object representations one can transmit additional detail.

3.4 Over the Air Download

For a fast proliferation of the search service it will be important to allow a download over the air of the client application. The client side application would essentially acquire an image and send appropriate image representations to recognition servers. It then would receive the search results in an appropriate format. Advantageously, such an application would be implemented in Java or BREW so that it is possible to download this application over the air instead of preloading it on the phone.

3.5 Reducing the Search Through Extra Input

Often it will be helpful to provide additional input to limit the image-based search to specific domains such as "travel guide" or "English dictionary". External input to confine the search to specific domains can come from a variety of sources. One is of course text input via typing or choosing from a menu of options. Another one is input via Bluetooth or other signals emitted from the environment. A good example for the later might be a car manual. While the user is close to the car for which the manual is available a signal is transmitted from the car to his mobile device that allows the search engine to offer a specific search tailored to car details. Finally a previous successful search can cause the search engine to narrow down search for a subsequent search.

Figure 5:
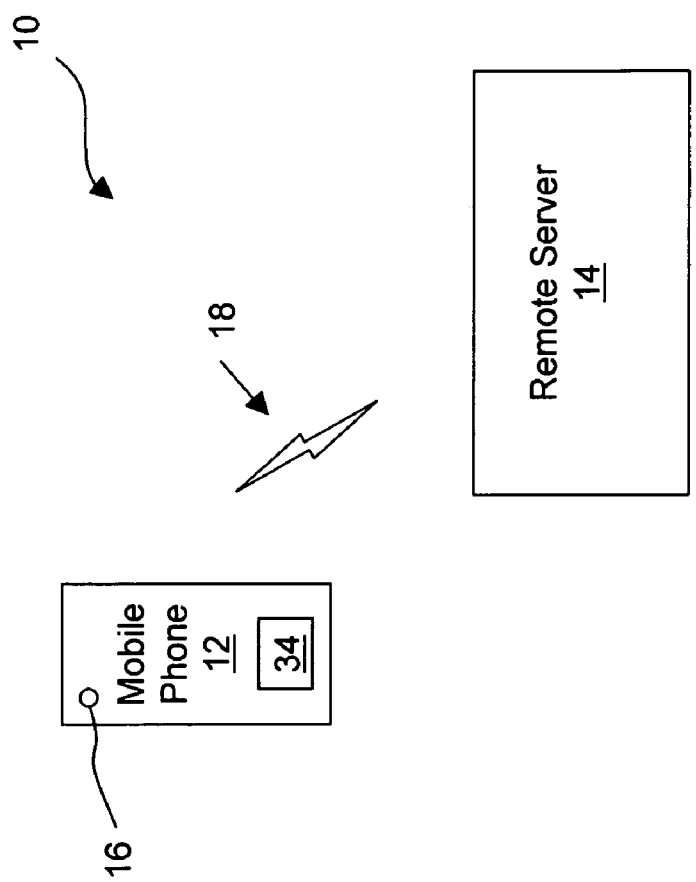
FIG. 5 is a block diagram of an image-based information retrieval system.

Accordingly, with reference to FIG. 5, the present invention may be embodied in an image-based information retrieval system 10 including a mobile telephone 12 and a remote server 14. The mobile telephone has a built-in camera 16, a recognition engine 32 for recognizing an object or feature in an image from the built-in camera, and a communication link 18 for requesting information from the remote server related to a recognized object or feature.

Accordingly, with reference to FIGS. 4 and 5, the present invention may be embodied in an image-based information retrieval system that includes a mobile telephone 12 and a remote recognition server 14'. The mobile telephone has a built-in camera 16 and a communication link 18 for transmitting an image 20 from the built-in camera to the remote recognition server. The remote recognition server has an optical character recognition engine 22 for generating a first confidence value based on an image from the mobile telephone, an object recognition engine, 24 and/or 26, for generating a second confidence value based on an image from the mobile telephone, a face recognition engine 28 for generating a third confidence value based on an image from the mobile telephone, and an integrator module 30 for receiving the first, second, and third confidence values and generating a recognition output. The recognition output may be an image description 32.

4.0 The Recognition Engines

The heart of the VMS system is the suite of recognition engines that can recognize various visual patterns from faces to bar codes.

4.1 Textured Object Recognition

We first discuss the general object recognition engine that can learn to recognize an object from a single image. If available the engine can also be trained with several images from different viewpoints or a short video sequence which often contributes to improving the invariance under changing viewing angle. In this case one has to invoke the view fusion module that is discussed in more detail below.

One of the most important features of an image-based search service is that it is possible for a user, who is not a machine vision expert, to easily submit entries to the library of objects that can be recognized. A good choice to implement such a recognition engine is based on the SIFT feature approach described by David Lowe in 1999. Essentially it allows to recognize an object based on a single picture.

Figure 6:
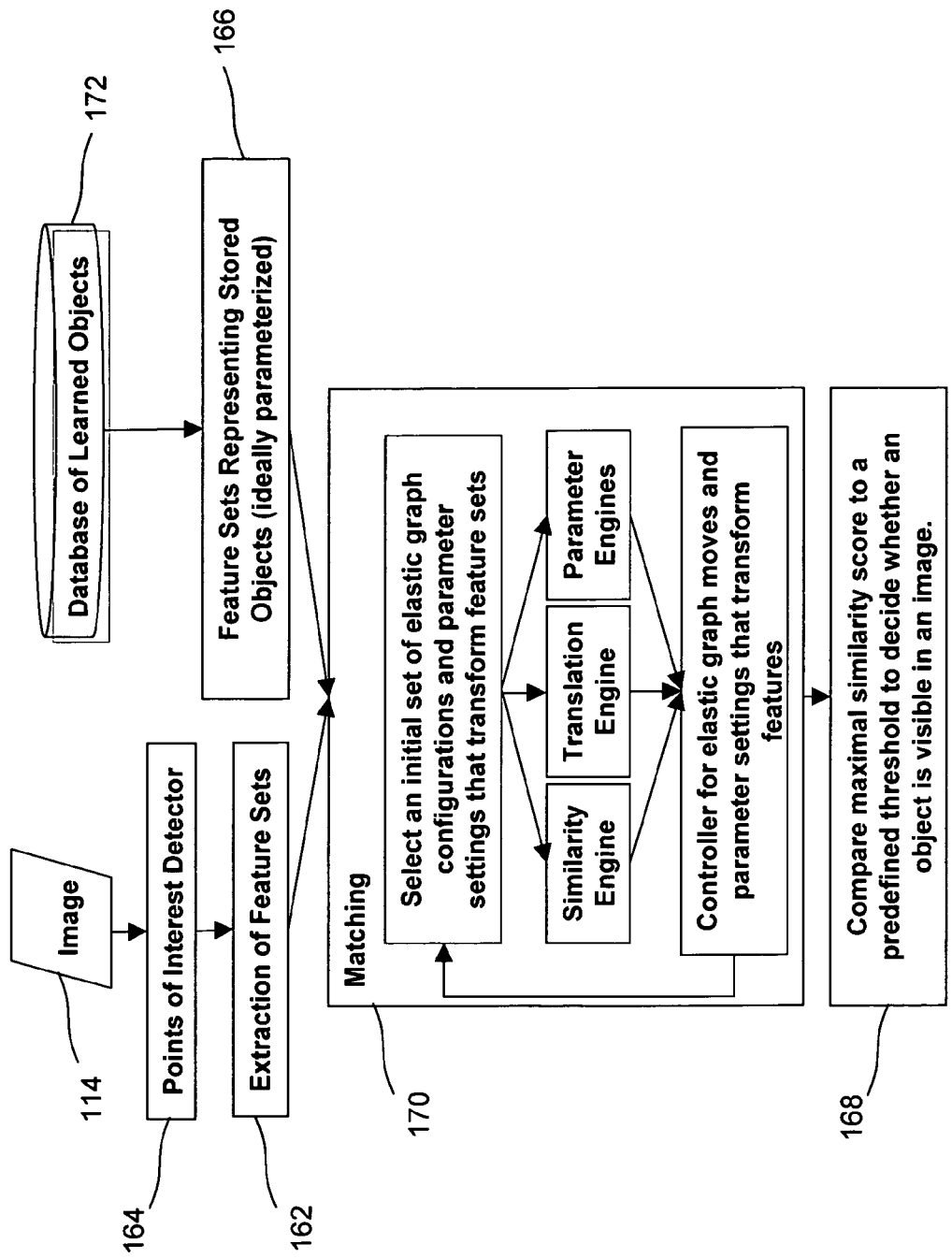
FIG. 6 is a flow diagram for an operation of an object recognition engine.

The macro algorithmic principles of the object recognition engine are: extraction of feature vectors 162 from key interest points 164, comparison 168 of corresponding feature vectors 166, similarity measurement and comparison against a threshold to determine if the objects are identical or not (see FIG. 6). Actually we believe that today there is large consensus that the elements listed above are the basic elements of any successful recognition system.

Taking Lowe's system as the baseline implementation we suggest employing certain alternative sub modules to perform certain steps better:

1) Interest Operator

Using phase congruency of Gabor wavelets is superior to many other interest point operators suggested in the literature such as affine Harris or DOG Laplace (Kovesi 1999).

2) Feature Vectors

Instead of Lowe's SIFT features we make extensive use of Gabor wavelets as a powerful general purpose data format to describe local image structure. However, where appropriate we augment them with learned features reminiscent of the approach pioneered by Viola and Jones (Viola and Jones 1999). Finally, we started to study the use of a dictionary of parameterized sets of feature vectors extracted from massive of image data sets that show variations under changing viewpoint and lighting conditions of generic surface patches: "Locons".

3) Matching 170

Almost all matching routines described in the literature only consider similarity between feature vectors. We also explicitly estimate displacement vectors as well as parameter sets that describe environmental conditions such as viewpoint and illumination conditions. This can be achieved by considering the phase information of Gabor wavelets or through training of dedicated neural networks.

Consequently, we believe that our system can more rapidly learn new objects and recognize them under a wider range of conditions than anyone else. Last but not least we have extensive experience in embedded recognition systems. The recognition algorithms are available for various DSPs and microprocessors.

4.1.1 View Fusion

To support the recognition of objects from multiple viewpoints, feature linking is applied to enable the use of multiple training images for each object to completely cover a certain range of viewing angles:

If one uses multiple training images of the same object without modification of the algorithm, the problem of competing feature datasets arises. The same object feature might be detected in more than one training image if these images are taken from a sufficiently similar perspective. The result is that any given feature can be present as multiple datasets in the database. Since any query feature can be matched to only one of the feature datasets in the database, some valid matches will be missed. This will lead to more valid hypotheses, since there are multiple matching views of the object in the database, but with fewer matches per hypothesis, which will diminish recognition performance. To avoid this degradation in performance, feature datasets can be linked so that all datasets of any object feature will be considered in the matching process.

To achieve the linking, the following procedure can be used: When enrolling a training image into the database, all features detected in this image will be matched against all features in each training image of the same object already enrolled in the database. The matching is done in the same way that the object recognition engine deals with probe images, except that the database is comprised of only one image at a time. If a valid hypothesis is found, all matching feature datasets are linked. If some of these feature datasets are already linked to other feature datasets, these links are propagated to the newly linked feature datasets, thus establishing networks of datasets that correspond to the same object feature. Each feature datasets in the network will have links to all other feature datasets in the network.

When matching a probe image against the database 172, in addition to the direct matches all linked feature datasets will be considered valid matches. This will significantly increase the number of feature matches per hypothesis and boost recognition performance at very little computational cost.

4.1.2 Logarithmic Search Strategy

An efficient implementation of a search service requires that the image search is organized such that it scales logarithmically with the number of entries in the database. This can be achieved by conducting a coarse-to-fine simple to complex search strategy such as described in (Beis and Lowe, 1997). The principal idea is to do the search in an iterative fashion starting with a reduced representation that contains only the most salient object characteristics. Only matches that result from this first pass are investigated closer by using a richer representation of the image and the object. Typically this search proceeds in a couple of rounds until a sufficiently good match using the most complete image and object representation is found.

To cut down the search times further we also propose to employ color histograms and texture descriptors such as those proposed under the MPEG7 standard. These image descriptors can be computed very rapidly and help to readily identify subsets of relevant objects. For instance a printed text tends to generate characteristic color histograms and shape descriptors. Thus it might be useful to limit the initial search to character recognition if those descriptors lie within a certain range.

4.2 Face Recognition Engine, Optical Character Recognition and Bar Code Readers

A face recognition engine described in (U.S. Patent No. 6,301,370 FACE RECOGNITION FROM VIDEO IMAGES, Oct. 9, 2001, Maurer Thomas, Elagin, Egor Valerievich, Nocera Luciano Pasquale Agostino, Steffens, Johannes, Bernhard, Neven, Hartmut) also allows to add new entries into the library using small sets of facial images. This system can be generalized to work with other object classes as well.

Adding additional engines such as optical character recognition modules and bar code readers allows for a yet richer set of visual patterns to be analyzed. Off-the-shelf commercial systems are available for licensing to provide this functionality.

5.0 Applications of the Visual Mobile Search Service

Let us start the discussion of the usefulness of image-based search with an anecdote. Imagine you are on travel in Paris and you visit a museum. If a picture catches your attention you can simply take a photo and send it to the VMS service. Within seconds you will receive an audio-visual narrative explaining the image to you. If you happen to be connected a 3G network the response time would be below a second. After the museum visit you might step outside and see a coffeehouse. Just taking another snapshot from within the VMS client application is all you have to do in order to retrieve travel guide information. In this case location information is available through triangulation or inbuilt GPS it can assist the recognition process. Inside the coffeehouse you study the menu but your French happens to be a bit rusty. Your image based search engine supports you in translating words from the menu so that you have at least an idea of what you can order.

This anecdote could of course easily be extended further. Taking a more abstract viewpoint one can say that image-based search hyperlinks the physical world in that any recognizable object, text string, logo, face, etc. can be annotated with multimedia information.

5.1 Travel and Museum Guides

Figure 7:
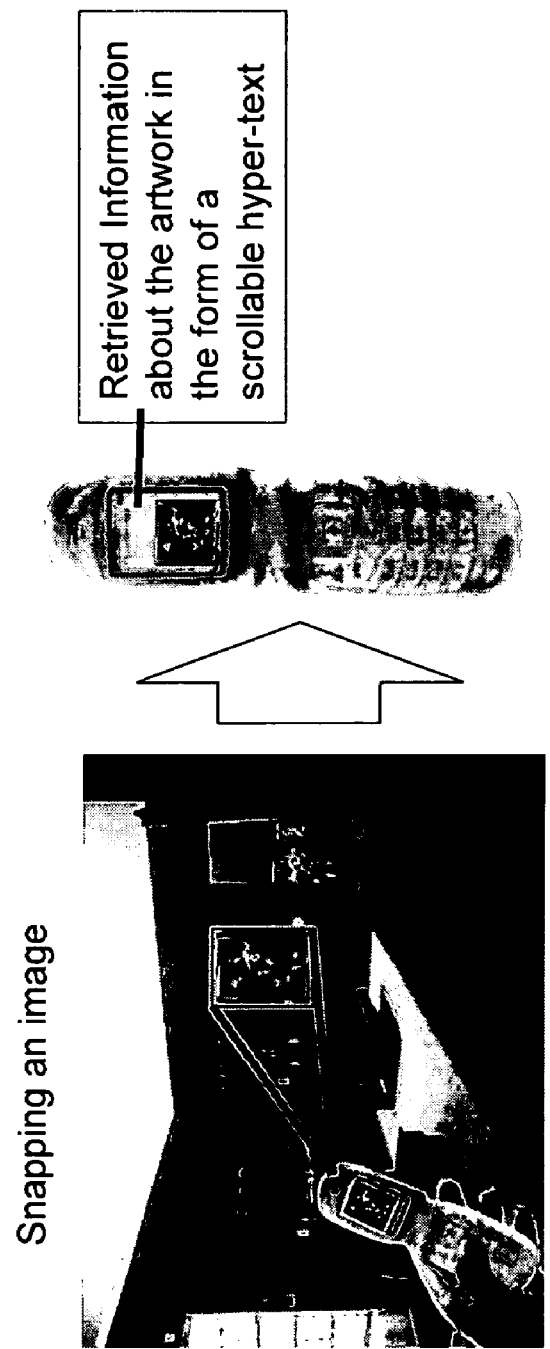
FIG. 7 illustrates an example of an intelligent museum guide implemented using the VMS service.

In the specific case of visiting and researching the art and architecture of museums, image-based information access, can provide the museum visitors and researchers with the most relevant information about the entire artwork or parts of an artwork in a short amount of time. The users of such a system can conveniently perform image-based queries on the specific features of an artwork, conduct comparative studies, and create personal profiles about their artworks of interest. FIG. 7 illustrates an example of the intelligent museum guide, where on the left side user has snapped an image of the artwork of his/her interest and on the right side the information about the artwork is retrieved from the server. In addition, users can perform queries about specific parts of an artwork not just about the artwork as a whole. The system works not only for paintings but for almost any other object of interest as well: statues, furniture, architectural details or even plants in a garden.

The proposed image-based intelligent museum guide is much more flexible than previously available systems, which for example perform a pre-recorded presentation based on the current position and orientation of the user in museum. In contrast, our proposed Image-Based Intelligent Museum Guide has the following unique characteristics:

1—Users can interactively perform queries about different aspects of an artwork. For example, as shown in FIG. 2, a user can ask queries such as: "Who is this person in the cloud?" Being able to interact with the artworks will make the museum visit a stimulating and exciting educational experience for the visitors, specifically the younger ones.

2—Visitors can keep a log of the information that they asked about the artworks and cross-reference them.

3—Visitors can share their gathered information with their friends.

4—Developing an integrated global museum guide is possible.

5—No extra hardware is necessary as many visitors carry cell-phones with inbuilt camera.

6—The service can be a source of additional income where applicable.

Presentation of the retrieved information will also be positively impacted by the recognition ability of the proposed system. Instead of having a 'one explanation that fits all' for an artwork, it is possible to organize the information about different aspects of an artwork in many levels of details and to generate a relevant presentation based on the requested image-based query. Dynamically generated presentations may include still images and graphics, overlay annotations, short videos and audio commentary and can be tailored for different age groups, and users with various levels of knowledge and interest.

Figure 8:
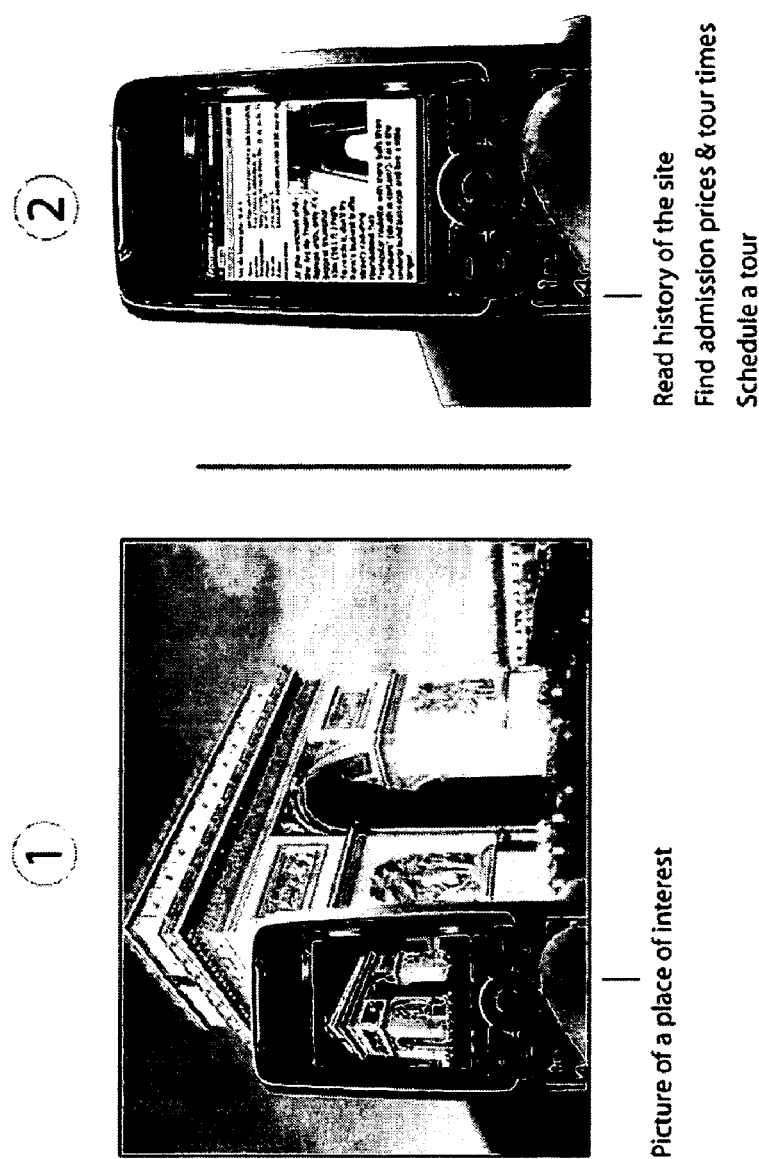
FIG. 8 illustrates an example of how VMS may be used as a tool for a tourist to access relevant information based on an image.

The museum application can readily be extended to other objects of interest to a tourist: landmarks, hotels, restaurants, wine bottles etc. It is also noteworthy that image-based search can transcend language barriers, and not just by invoking explicitly an optical character recognition subroutine. The Paris coffeehouse example would work the same way with a sushi bar in Tokyo. It is not necessary to know Japanese characters to use this feature. FIG. 8 illustrates how VMS may be used as a tool for a tourist to quickly and comfortably access relevant information based on an acquired image.

5.1.1 Optical Character Recognition with Language Translation

A specific application of the image-based search engine is recognition of words in a printed document. The optical character recognition sub-engine can recognize a word which then can be handed to an encyclopedia or dictionary. In case the word is from a different language than the user's preferred language a dictionary look-up can translate the word before it is processed further.

5.2 Media Bridging and Mobile Advertising

Image-based search can support new print-to-internet applications. If you see a movie ad in a newspaper or on a billboard you can quickly find out with a single click in which movie theaters it will show.

Image-based mobile search can totally alter the way how many retail transactions are done. To buy a Starbucks coffee on your way to the airplane simply click on a Starbucks ad. This click brings you to the Starbucks page, a second click specifies your order. That is all you will have to do. You will be notified via a text message that your order is ready. An integrated billing system took care of your payment.

A sweet spot for a first commercial roll-out is mobile advertising. A user can send a picture of a product to a server that recognizes the product and associates the input with the user. As a result the sender could be entered into a sweepstake or he could receive a rebate. He could also be guided to a relevant webpage that will give him more product information or would allow him to order this or similar products.

Figure 9:
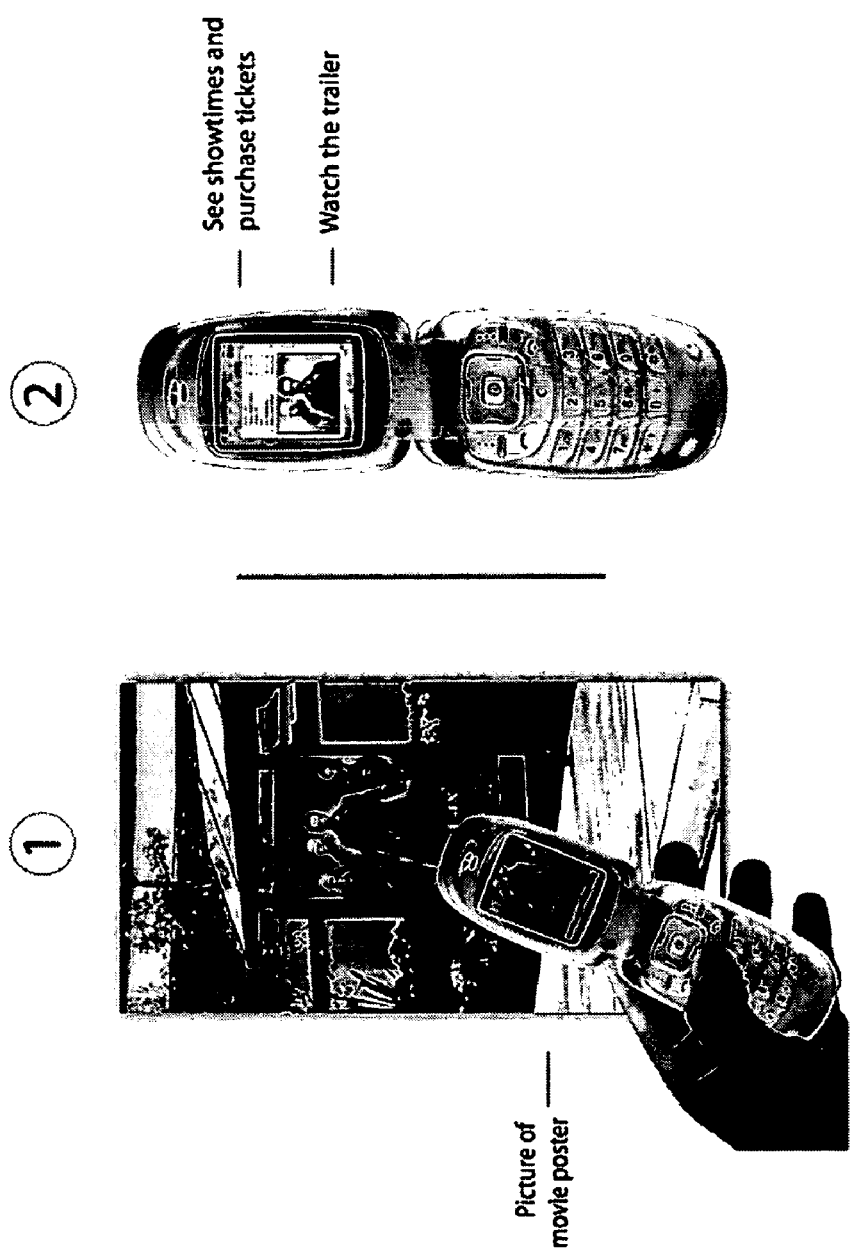
FIG. 9 illustrates an example of how VMS may be used in using traditional print media as pointers to interactive content; and, FIGS. 10-11 are figures used to describe the use of the VMS client.

Image-based search using a mobile phone is so powerful because the confluence of location, time, and user information with the information from a visual often makes it simple to select the desired information. The mobile phone naturally provides context for the query. FIG. 9 illustrates how VMS allows using traditional print media as pointers to interactive content.

Another useful application of image-based search exists in the print-to-internet space. By submitting a picture showing a portion of a printed page to a server a user can retrieve additional, real-time information about the text. Thus together with the publishing of the newspaper, magazine or book it will be necessary to submit digital pictures of the pages to the recognition servers so that each part of the printed material can be annotated. Since today's printing process in large parts starts from digital versions of the printed pages this image material is readily available. In fact it will allow using printed pages in whole new ways as now they could be viewed as mere pointers to more information that is available digitally.

A special application is an ad-to-phone number feature that allows a user to quickly input a phone number into his phone by taking a picture of an ad. Of course a similar mechanism would of useful for other contact information such as email, SMS or web addresses.

5.2.1 Interactive Digital Billboard

Visual advertising content may be displayed on a digital billboard or large television screen. A user may take of picture of the billboard and the displayed advertisement to get additional information about the advertised product, enter a contest, etc. The effectiveness of the advertisement can be measured in real time by counting the number of "clicks" the advertisement generates from camera phone users. The content of the advertisement may by adjusted to increase its effectiveness based on the click rate.

The billboard may provide time sensitive advertisements that are target to passing camera phone users such as factory workers arriving leaving work, parents picking up kids from school, or the like. The real-time click rate of the targeted billboard advertisements may confirm or refute assumptions used to generated the targeted advertisement.

5.3 Payment Tool

Image recognition can also be beneficially integrated with a payment system. When browsing merchandise a customer can take a picture of the merchandise itself, of an attached barcode, of a label or some other unique marker and send it to the server on which the recognition engine resides. The recognition results in an identifier of the merchandize that can be used in conjunction with user information, such as his credit card number to generate a payment. A record of the purchase transaction can be made available to a human or machine-based controller to check whether the merchandise was properly paid.

5.4 Learning Tool For Children

A group of users in constant need for additional explanations are children. Numerous educational games can be based on the ability to recognize objects. For example one can train the recognition system to know all countries on a world map. Other useful examples would be numbers or letters, parts of the body etc. Essentially a child could read a picture book just by herself by clicking on the various pictures and listen to audio streams triggered by the outputs of the recognition engine.

Other special needs groups that could greatly benefit from the VMS service are blind and vision impaired people.

5.5 Treasure Hunt Games

Object recognition on mobile phones can support a new form of games. For instance a treasure hunt game in which the player has to find a certain scene or object say the facade of a building. Once he takes the picture of the correct object he gets instructions which tasks to perform and how to continue.

5.7 Product Information and User Manuals

Image-based search will be an invaluable tool to the service technician, who wants more information about a part of a machine; he now has an elegant image query based user manual.

Image-based information access facilitates the operation and maintenance of equipment. By submitting pictures of all equipment parts to a database, the service technicians will continuously be able to effortlessly retrieve information about the equipment they are dealing with. Thereby they drastically increase their efficiency in operating gear and maintenance operations.

5.9 Public Space Annotation

Another important area is situations in which it is too costly to provide desired real-time information. Take a situation as profane as waiting for a bus. Simply by clicking on the bus stop sign you could retrieve real-time information on when the next bus will come because the location information available to the phone is often accurate enough to decide which bus stand you are closest to.

5.10 Virtual Annotation

A user can also choose to use the object recognition system in order to annotate objects in way akin to "Virtual Post-it Notes". A user can take a photo of an object and submit it to the database together with a textual annotation that he can retrieve later when taking a picture of the object.

5.11 User Generated Content

Another important application is to offer user communities the possibility to upload annotated images that support searches that serve the needs of the community. To enable such use cases that allow users who are not very familiar with visual recognition technology to submit images used for automatic recognition one needs take precautions that the resulting databases are useful. A first precaution is to ensure that images showing identical objects are not entered under different image IDs. This can be achieved by running a match for each newly entered image against the database that already exists.

6.0 Business Models

To offer the image based search engine in an economically viable fashion we propose to apply the following business models.

The VMS service is best offered on a transaction fee basis. When a user queries the service at transaction fee applies. Of course individual transaction fees can be aggregated in to a monthly flat rate. Typically the transaction fee is paid by the user or is sponsored by say advertisers.

To entice users to submit interesting images to the recognition service we suggest to put in place programs that provide for revenue sharing with the providers of annotated image databases. This a bit akin to the business model behind iStockPhoto.

7.0 Tutorial For a Current Implementation

This section describes in detail the steps a user has to go through to handle a current implementation of VMS called the Neven Vision oR system. The client is called iScout, is implemented in Java and runs on a Nokia 6620 phone.

7.1 Overview

The following is a brief tutorial for using the Object Recognition (oR) system that includes step-by-step instructions for Adding Images to the oR Server Database, Recognizing an Image, and Specifying Content. A brief troubleshooting section is also included.

7.2 Installation

In order to use this document you will need to install the oR client named iScout on a Nokia 6620 phone.

Download the client application from the internet onto a computer

Installing application using Bluetooth
1. You must have a Bluetooth adapter installed on your machine.
2. On the phone navigate to Connect>Bluetooth.
3. Select it and make sure Bluetooth is on.
4. On your computer Browse to the folder you copied the iScout0.6.jar installation file.
5. Right click on the file and select Send To>Bluetooth Device.
6. Click Browse.
7. Your phone's name should appear in the list. Select it and click OK.
8. Click Next.
9. On the phone click Yes to accept the message.
10. When the message alert pops up, click show.
11. This will launch the installer. Click Yes throughout and accept all defaults.

Installing application using Nokia PC Suite and data cable
1. Install the program and USB drivers for the PC using the CD that came with the phone.
2. After successful installation plug in your phone to the data cable.
3. Right click on iScout1.0.jar and select "Install with Nokia Application Installer."
4. Follow the instruction to install the application.

7.3 Specifying Content on the Media Server

The Media Server can be used for setting up content to be displayed on a client when an object is recognized.

7.3.1 Associating New Content with an Image in the OR Server Database

Go to http://recognitionserver.nevenvision.com/or and enter your "user" for the username and "1234" for the password.

Click Add New Record.

Type in a name of the object into the ID field. This can either be a new name, or a reference name used if you used when adding an image to the OR server database.
NOTE: Spaces in the ID are not permitted at this time.

Use the fields to supply an image from your computer, descriptive text, and a URL that the client can open if desired. If you do not want the client to automatically open a web browser you may enter "none" in the field.

7.3.2 Updating/Viewing Existing Content

Click Update.

Select the ID you wish to update/view from the dropdown. This will give you a preview of the content for the given ID.

Modify anything you wish to change.

Click update when finished.

7.3.3 Adding an Image to the OR Server Database

Another way to add images to the OR Server (other than using the client) is to add an image directly from your computer.

Click Add New Record under Image Database Administration.

Enter a reference name and use the Browse button to load an Image.

Click Review/Delete Image Database Record to view the added image.

7.3.4 Reviewing Images in the OR Server Database

Choose an ID and click Review/Delete Record

If desired click Delete on the image to remove it from objects that may be recognized.

NOTE: This will not remove any media content associated with this image.

7.3.5. Adding Content for an Image in the OR Server Database

For the case where you used the client to add an image to the OR Server database. and supplied it with a new ID, and you do not see it in the combo on the Update page, do the following:

Follow the Adding New Content instructions, and use the reference name you entered on the client for the ID.

7.4 Adding an Image to the OR Server Using the Client

Figure 10:
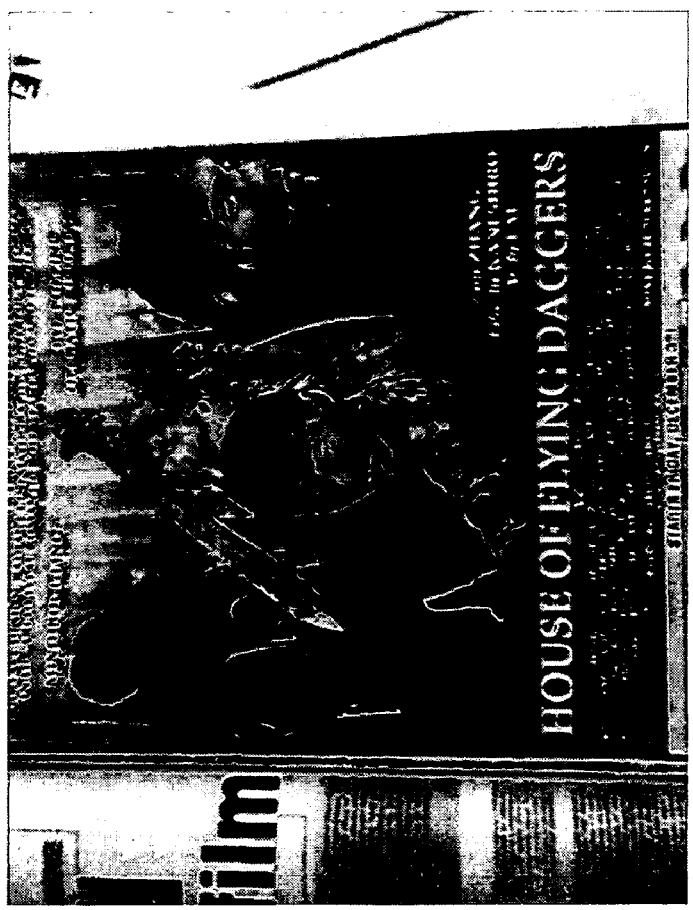

Step 1:

Find an appropriate object that you wish to attach content to (FIG. 10).

Step 2:

Run iScout. It will initialize the camera allowing you to take a picture of the object.

Figure 11:
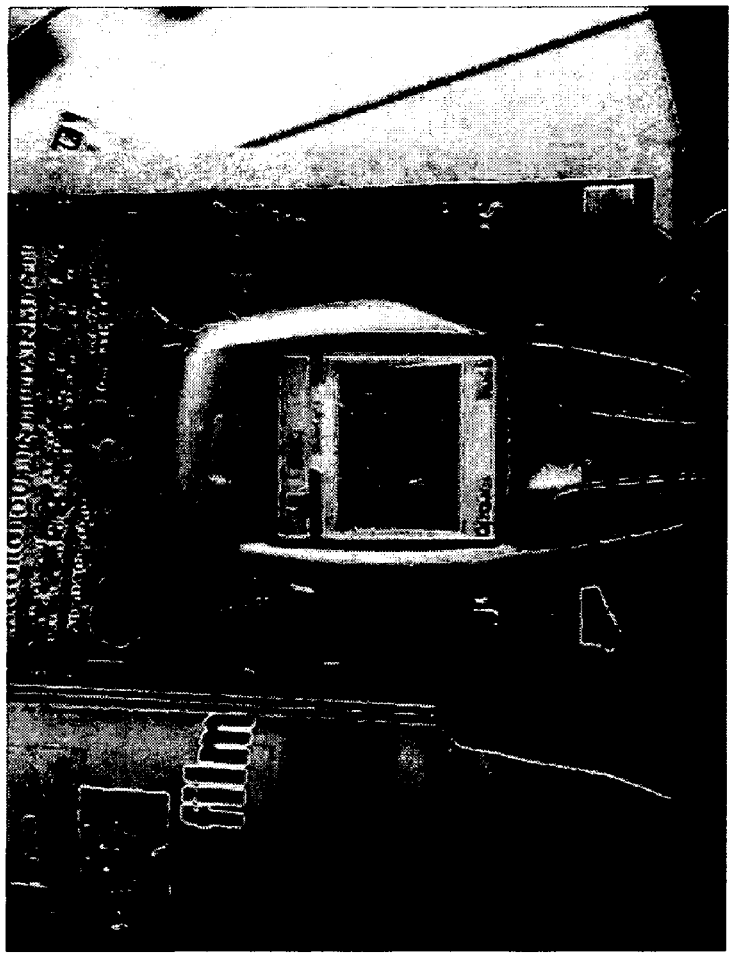

Click the joystick in to snap an image (FIG. 11).

Step 3:

After taking an image of the object, you will be presented with two choices:

1) Recognize Image
2) Add to Database

Select Add to Database, click Option and then Continue. The application will ask if it can connect to the internet, click Yes.

You will be prompted for a reference name. Type in a name using the phones keypad. If you already set up content for this object using the Specifying Content section, you may enter the reference name you added to the system. Alternatively, you can supply a new name now and follow the Add New Content section to supply content at a later time. NOTE: Spaces in the reference name are not permitted at this time.

Click Options/Continue once again. You may be prompted with a choice of how to connect to the internet; Select the default.

You will see a message Successfully Opened Output Stream. The image is now being sent to the Recognition Server. This may take several seconds to complete.

The system will respond that the image has been saved once the operation is complete. You are now ready to test the recognition of this object.

7.5 Recognizing an Object with the Client

Referring back to FIG. 3, the following is an overview of the process of recognizing an image.

Step 1:

Follow Step 1 and Step 2 from the Adding an Image to the OR Server section to capture an image of the object.

Step 2:

Select Recognize Image.

Click Option then Continue.

You will see a message Successfully Opened Output Stream. The image is now being sent to the Recognition Server. This may take several seconds to complete.

Step 3:

Depending on the content associated with the object (See Specifying Content below) you may see any of the following:

1. A simple message stating Received Message is: followed by the reference name. You may use this name in the Specifying Content to have the Media Server return more appealing content when this object is recognized.

2. An image, reference name, and URL. You may need to press the up and down arrow to see the entire message. Select Options>Go To Hyperlink to launch the internet browser and view the web page referred by the URL.

3. An Object Not Found message. The image was not recognized by the Recognition Server.

If the object has already been already been added to the OR server database, try to recognize it again.

If it has not been added to the OR Server database you may wish to follow the Adding an Image to the OR Server Database section so that it too may be recognized.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It should be noted that the methods described herein may be implemented on a variety of communication hardware, processors and systems known by one of ordinary skill in the art. For example, the general requirement for the client to operate as described herein is that the client has a display to display content and information, a processor to control the operation of the client and a memory for storing data and programs related to the operation of the client. In one embodiment, the client is a cellular phone. In another embodiment, the client is a handheld computer having communications capabilities. In yet another embodiment, the client is a personal computer having communications capabilities. In addition, hardware such as a GPS receiver may be incorporated as necessary in the client to implement the various embodiments described herein. The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments described above are exemplary embodiments. Those skilled in the art may now make numerous uses of, and departures from, the above-described embodiments without departing from the inventive concepts disclosed herein. Various modifications to these embodiments may be readily apparent to those skilled in the art, and the generic principles defined herein may be applied to other embodiments, e.g., in an instant messaging service or any general wireless data communication applications, without departing from the spirit or scope of the novel aspects described herein. Thus, the scope of the invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

What is claimed is:

1. An image-based information retrieval system, comprising:
   a database configured to store images in association with object representations and text identifiers, the object representations of the images comprising feature vectors, wherein the feature vectors for at least one image are parameterized according to a corresponding illumination condition of the at least one image; and
   a recognition server system configured to receive an image, and further configured to match the received image using the feature vectors of an object representation in the database, and further configured to forward the associated text identifier for a matching object representation to a media server.

2. The image-based information retrieval system of claim 1, wherein the recognition server system includes:
   an optical character recognition engine for generating a first confidence value based on the received image,
   an object recognition engine for generating a second confidence value based on the received image,
   a face recognition engine for generating a third confidence value based on the received image, and
   an integrator module for receiving the first, second, and third confidence values and identifying the associated text identifier;
   wherein at least one of the optical character recognition, the object recognition engine, and the face recognition engine uses the parameterized feature vectors of the received image.

3. The image-based information retrieval system of claim 2, wherein the object recognition engine comprises a textured object recognition engine.

4. The image-based information retrieval system of claim 2, wherein the object recognition engine comprises a rigid texture object recognition engine.

5. The image-based information retrieval system of claim 2, wherein the object recognition engine comprises an articulate object recognition engine.

6. The image-based information retrieval system of claim 1, wherein the recognition server system includes means for adding an object representation to the database using a mobile telephone.

7. The image-based information retrieval system of claim 1, wherein the images are stored in further association with object features and with locations at which the images were created, and wherein the recognition server system is further configured to recognize an object feature in the received image, to match the received image using the recognized object feature, and to request information related to the recognized object feature from a remote server.

8. The image-based information retrieval system of claim 7, wherein the object feature is text and the related information is a translation of the text.

9. The image-based information retrieval system of claim 7, wherein the object feature is text and the related information is a web page address.

10. The image-based information retrieval system of claim 9, wherein the remote server provides the web page address to the mobile telephone in real-time.

11. The image-based information retrieval system of claim 7, wherein the object feature is an advertisement and the related information is a web page address.

12. The image-based information retrieval system of claim 7, wherein the object feature is a picture and the related information is an audio stream.

13. The image-based information retrieval system of claim 7, wherein the object feature is an equipment part and the related information is an operation and maintenance manual for the equipment.

14. The image-based information retrieval system of claim 1, wherein the images are stored in further association with locations at which the images were created, and wherein the recognition server system matches the received image in part using the locations.

15. A method of recognizing an object in an image using an image recognition system, the method comprising:
   storing, by the image recognition system, for each of a plurality of objects, a set of linked feature vectors representing images of the object from a plurality of viewing angles;
   storing, by the image recognition system, in association with the set of linked feature vectors of at least a first object of the plurality of objects, times of day at which the images represented by the linked feature vectors were created;
   receiving, by the image recognition system, an image having at least one object without a known viewing angle;
   extracting, by the image recognition system, feature vectors from the received image; and recognizing, by the image recognition system, at least the first object in the received image from at least one viewing angle by a finding a closest matching set of linked feature vectors to the extracted feature vectors and by comparing the times of day associated with the closest matching set of linked feature vectors to a time of day of the received image.

16. The method of claim 15, wherein recognizing the at least the first object comprises using a textured object recognition engine.

17. The method of claim 15, wherein recognizing the at least the first object comprises using a rigid texture object recognition engine.

18. The method of claim 15, wherein recognizing the at least the first object comprises using an articulate object recognition engine.

19. The method of claim 15, wherein the first recognized object is an advertising billboard, the method further comprising requesting a web page address related to the advertising billboard from a remote server.

20. The method of claim 15, wherein the first recognized object is a car, the method further comprising requesting a car manual related to the car from a remote server.

21. The method of claim 15, wherein the first recognized object is a product, the method further comprising requesting a payment confirmation related to the product from a remote server.

22. The method of claim 15, wherein the first recognized object is a book, the method further comprising requesting an audio stream related to the book from a remote server.

23. The method of claim 15, wherein the first recognized object is a bus stop sign, the method further comprising requesting real-time information on the arrival of a next bus from a remote server.

24. A method of recognizing an image, comprising:
storing images in a database in association with object representations and text identifiers, the object representations of the images comprising feature vectors, wherein the feature vectors for at least one image are parameterized according to a corresponding illumination condition of the at least one image;
receiving an image; and
matching the received image with an object representation in the database using the feature vectors of the object representation in the database.

25. The method of claim 24, further comprising adding an object representation to the database using a mobile telephone.

26. The method of claim 24, further comprising:
storing the images in further association with object features and with locations at which the images were created;
recognizing an object feature in the received image;
matching the received image using the recognized object feature; and
requesting information related to the recognized object feature from a remote server.

27. The method of claim 26, wherein the object feature is text and the related information is a translation of the text.

28. The method of claim 26, wherein the object feature is a picture and the related information is an audio stream.

29. A computer-readable storage medium storing a computer program executable by a processor for recognizing an image, the actions of the computer program comprising:
storing images in a database in association with object representations and text identifiers, the object representations of the images comprising feature vectors, wherein the feature vectors for at least one image are parameterized according to a corresponding illumination condition of the at least one image;
receiving an image; and
matching the received image with an object representation in the database using the feature vectors of the object representation in the database.

30. The computer-readable storage medium of claim 29, wherein matching the received image comprises:
using an optical character recognition engine to generate a first confidence value based on the received image,
using an object recognition engine to generate a second confidence value based on the received image,
using a face recognition engine to generate a third confidence value based on the received image, and
using an integrator module to receive the first, second, and third confidence values and to identify the associated text identifier;
wherein at least one of the optical character recognition, the object recognition engine, and the face recognition engine uses the parameterized feature vectors of the received image.

31. The computer-readable storage medium of claim 30, wherein the object recognition engine comprises a textured object recognition engine.

32. The computer-readable storage medium of claim 30, wherein the images are stored in further association with locations at which the images were created, and wherein the recognition server system matches the received image in part using the locations.

33. An image recognition system, comprising:
a database configured to store:
for each of a plurality of objects, a set of linked feature vectors representing images of the object from a plurality of viewing angles, and
in association with the set of linked feature vectors of at least a first object of the plurality of objects, times of day at which the images represented by the linked feature vectors were created; and
a recognition server system configured to:
receive an image having at least one object without a known viewing angle,
extract feature vectors from the received image, and
recognize at least the first object in the received image from at least one viewing angle by a finding, in the database, a closest matching set of linked feature vectors to the extracted feature vectors, and by comparing the times of day associated with the closest matching set of linked feature vectors to a time of day of the received image.

34. The image recognition system of claim 33, wherein recognizing the at least the first object comprises using a rigid texture object recognition engine.

35. The image recognition system of claim 34, wherein the first recognized object is an advertising billboard, the recognition server system further configured to request a web page address related to the advertising billboard from a remote server.

36. A computer-readable storage medium storing a computer program executable by a processor for recognizing a first object in an image, the actions of the computer program comprising:
storing, for each of a plurality of objects, a set of linked feature vectors representing images of the object from a plurality of viewing angles;
storing, in association with the set of linked feature vectors of at least a first object of the plurality of objects, times of day at which the images represented by the linked feature vectors were created;

receiving an image having at least one object without a known viewing angle;

extracting feature vectors from the received image; and recognizing at least the first object in the received image from at least one viewing angle by a finding a closest matching set of linked feature vectors to the extracted feature vectors and by comparing the times of day associated with the closest matching set of linked feature vectors to a time of day of the received image.

37. The computer-readable storage medium of claim 36, wherein the first object is an advertising billboard, the actions of the computer program further comprising requesting a web page address related to the advertising billboard from a remote server.

38. The computer-readable storage medium of claim 36, wherein the first object is a product, the actions of the computer program further comprising requesting a payment confirmation related to the product from a remote server.

* * * * *

UNITED STATES PATENT AND TRADEMARK OFFICE
CERTIFICATE OF CORRECTION

PATENT NO.       : 7,751,805 B2                              Page 1 of 1
APPLICATION NO.  : 11/433052
DATED            : July 6, 2010
INVENTOR(S)      : Hartmut Neven, Sr. et al.

It is certified that error appears in the above-identified patent and that said Letters Patent is hereby corrected as shown below:

Title Page, Item (57), Column 2, in Abstract; in line 10, after "remote", add "media".

Signed and Sealed this
Twenty-fifth Day of January, 2011

David J. Kappos
*Director of the United States Patent and Trademark Office*